United States Patent [19]
Seelen et al.

[11] Patent Number: 5,275,357
[45] Date of Patent: Jan. 4, 1994

[54] AIRCRAFT ENGINE MOUNT

[75] Inventors: Laurence Seelen, Cincinnati; Thomas P. Joseph, West Chester; James E. Cencula, Middletown; Donald L. Bellia; Hahn M. Spofford, both of West Chester, all of Ohio

[73] Assignee: General Electric Company, Cincinnati, Ohio

[21] Appl. No.: 821,376

[22] Filed: Jan. 16, 1992

[51] Int. Cl.$^5$ .................. B64D 27/00; F02C 7/20
[52] U.S. Cl. ........................ 244/54; 60/39.031; 248/555; 248/554
[58] Field of Search .......... 244/54, 55; 60/39.31; 248/554, 555

[56] References Cited

U.S. PATENT DOCUMENTS

| | | | |
|---|---|---|---|
| 3,042,349 | 7/1962 | Pirtle et al. | 248/554 |
| 3,809,340 | 5/1974 | Dolgy et al. | 244/54 |
| 4,326,682 | 4/1982 | Nightingale | 248/554 |
| 4,603,822 | 8/1986 | Chee | 244/54 |
| 4,717,094 | 1/1988 | Chee | 244/54 |
| 4,725,019 | 2/1988 | White | 244/54 |
| 4,742,975 | 5/1988 | Pachomoff et al. | 248/554 |
| 4,943,013 | 7/1990 | Kapala et al. | 244/54 |
| 5,078,342 | 1/1992 | Langley et al. | 60/39.31 |

FOREIGN PATENT DOCUMENTS 1236917 6/1971 United Kingdom ............ 248/554

OTHER PUBLICATIONS

M. H. Schneider, GE Airline Review Team, GE 90 Nacelle Structures, Aftmount.
General Electric Company, CF6-80C2 aft engine mount drawing, in production for more than one year, single drawing sheet, FIG. 2.3.
Boeing, "777 Propulsion Design Review GE90 Strut Structure and Fairings," Feb. '91, five pages.

Primary Examiner—Joseph F. Peters, Jr.
Assistant Examiner—Virna Lissi Ansley
Attorney, Agent, or Firm—Jerome C. Squillaro

[57] ABSTRACT

An aircraft engine mount includes a frame fixedly joined in a gas turbine engine and a platform fixedly joined to an aircraft wing or tail pylon. A first beam is pivotally joined to the frame and the platform at first and second joints, respectively. The first beam is additionally joined to the platform at a third joint which allows longitudinal movement between the first beam and the platform at the third joint while preventing rotation of the first beam. A second beam is spaced from the first beam and is pivotally joined to the frame and platform at fourth and fifth joints, respectively, and is additionally joined to the platform at a sixth joint for allowing limited rotation of the second beam during normal operation while preventing rotation of the second beam upon a failure of the first beam to carry load.

12 Claims, 5 Drawing Sheets

AIRCRAFT ENGINE MOUNT

TECHNICAL FIELD

The present invention relates generally to aircraft mounted gas turbine engines, and, more specifically, to a mount for supporting an engine to a wing or tail pylon.

BACKGROUND ART

A gas turbine engine is typically mounted below an aircraft wing or within an aircraft tail section to a pylon. The engine is typically mounted at both its forward end and at its aft end for transmitting loads to the pylon. The loads typically include vertical loads such as the weight of the engine itself, axial loads due to the thrust generated by the engine, side loads such as wind buffeting, and roll loads or moments due to rotary operation of the engine. The mounts must also accommodate both axial and radial thermal expansion and contraction of the engine relative to the supporting pylon.

In one type of aft mount, a support bracket is fixedly joined to the pylon by two spaced pins in a plane extending perpendicularly through the centerline of the engine, and to a turbine frame in the engine by a third pin in an L-shaped configuration. Spaced circumferentially from the bracket is a simple link which is pivotally joined to both the pylon and the frame. The bracket is provided so that the aft mount assembly can accommodate in-plane loads, i.e. those in a single vertical axial plane extending perpendicularly to the engine longitudinal centerline axis, including the vertical loads, side or horizontal loads, and roll loads or moments, and, therefore, the bracket does not rotate. By rigidly joining the bracket to the pylon at two points and to the frame at a single point, the bracket can transfer in-plane loads from the frame to the pylon through tension, compression, and bending of the bracket.

The link, however, by being pivotally joined between the pylon and frame can only transfer tensile and compressive loads along its longitudinal axis between its mounting pins. The link is otherwise free to rotate in-plane relative to the pylon and frame. Allowing the link to rotate is required for accommodating radial expansion and contraction of the frame without introducing additional reaction stresses which would otherwise occur if the link connection to the frame were prevented from moving relative to the bracket connection to the frame during thermal expansion and contraction.

This exemplary aft mount may further include a failsafe bracket disposed between the support bracket and link which is normally not a load bearing member, but is provided solely for carrying loads upon failure of either the link or support bracket. The failsafe bracket is fixedly joined at its proximal end to the pylon and includes an aperture at its distal end through which is positioned a pin fixedly joined to the frame. A predetermined clearance is provided between the pin and the aperture so that during normal operation of the mount, no loads are transferred from the frame to the pylon through the failsafe bracket. However, upon failure of either the link or the support bracket, the pin will contact the failsafe bracket at its aperture for transferring loads through the failsafe bracket from the frame to the pylon which would otherwise be transmitted through the failed member. The failsafe bracket is fixedly joined to the pylon and does not rotate to ensure that it also can transfer all in-plane loads including vertical and horizontal loads. This is required because the link is allowed to pivot and is, therefore, unable to transfer all in-plane loads if the support bracket were to fail.

This exemplary failsafe bracket is relatively large and heavy for accommodating the required in-plane loads therethrough, and also affects the ability to obtain a compact aft mount which must typically fit within a limited envelope between the engine and the pylon without adversely affecting the airflow over the outer surfaces of the engine nacelle and the pylon fairing.

Furthermore, in order to fit the aft mount in this limited envelope, the distance between the two pins of the support bracket joined to the pylon is typically shorter than the distance between the pin of the support bracket joined to the frame and the middle pin of the support bracket on the pylon. Accordingly, a transverse load acting on the pin at the frame bends the support bracket about the middle pin and results in an amplified reaction couple shear load acting on the middle pin which must be suitably accommodated, by providing a larger diameter pin, for example, to ensure acceptable life.

OBJECTS OF THE INVENTION

Accordingly, one object of the present invention is to provide a new and improved aircraft engine mount.

Another object of the present invention is to provide an aircraft engine mount having a simpler failsafe device, and is lighter in weight.

Another object of the present invention is to provide an aircraft engine mount which is compact and is effective for reducing reaction couple shear pin loads.

DISCLOSURE OF INVENTION

An aircraft engine mount includes a frame fixedly joined in a gas turbine engine, and a platform fixedly joined to an aircraft pylon. A first beam is pivotally joined to the frame and the platform at first and second joints, respectively. The first beam is additionally joined to the platform at a third joint which allows longitudinal movement between the first beam and the platform at the third joint while preventing rotation of the first beam. A second beam is spaced from the first beam and is pivotally joined to the frame and platform at fourth and fifth joints, respectively, and is additionally joined to the platform at a sixth joint for allowing limited rotation of the second beam during normal operation while preventing rotation of the second beam upon a failure of the first beam to carry load.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(D) FOR CARRYING OUT THE INVENTION

Figure 1:
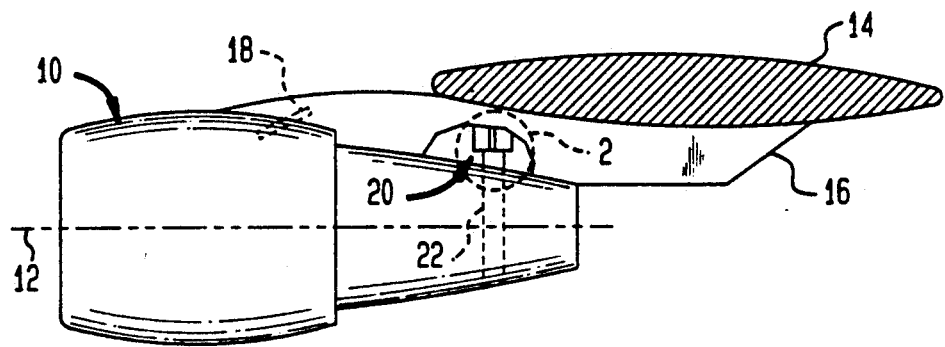
FIG. 1 is a side view of a gas turbine engine mounted to a pylon below an aircraft wing by an aft mount in accordance with one embodiment of the present invention.

Illustrated in FIG. 1 is an exemplary high bypass gas turbine engine 10 having a longitudinal or axial centerline axis 12 mounted below an aircraft wing 14. The wing 14 includes a pylon 16, and the engine 10 is mounted to the pylon at a conventional forward mount 18, shown in dashed line, and an aft mount 20 spaced axially downstream from the forward mount 18.

Figure 2:
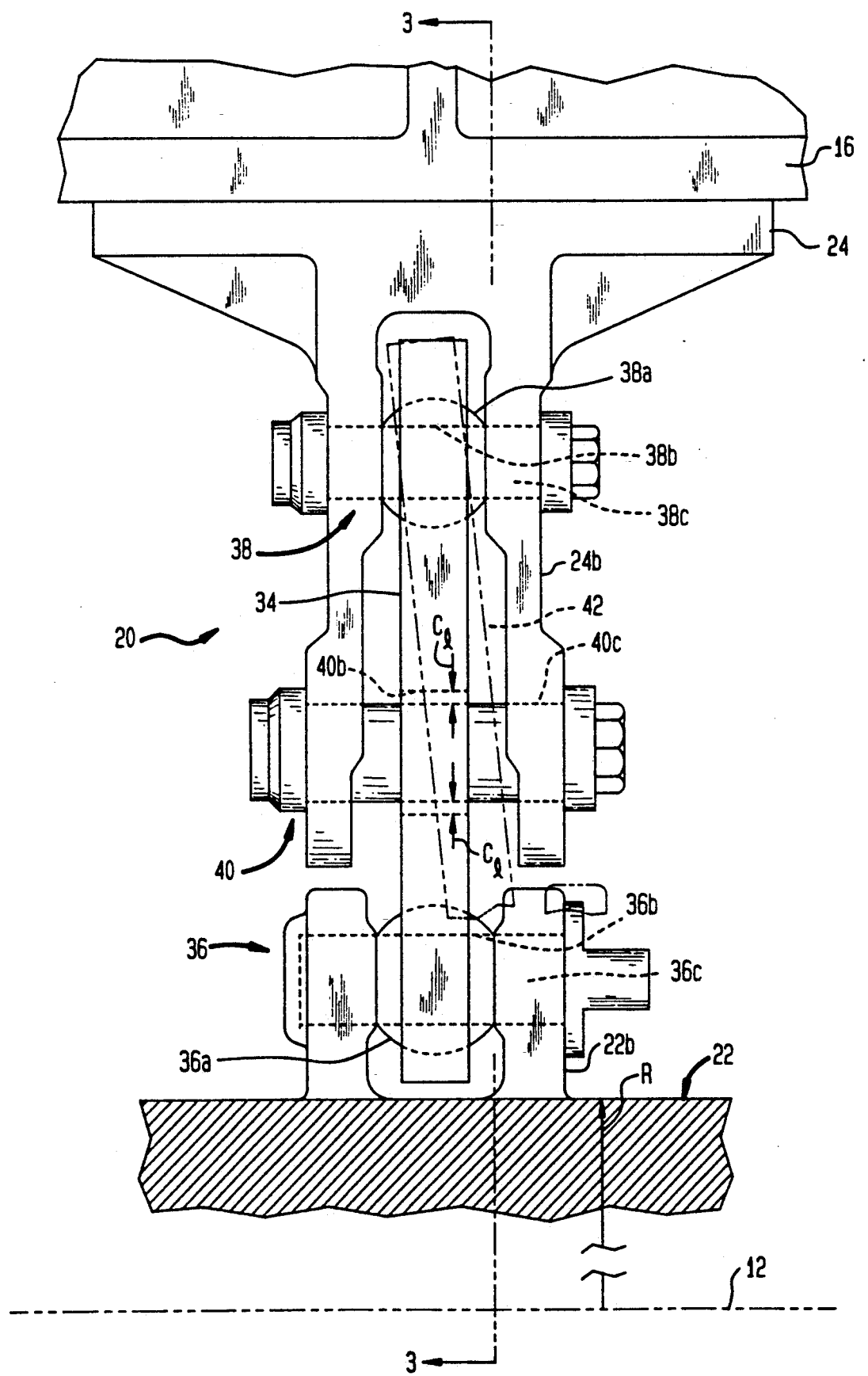
FIG. 2 is an enlarged side view of the aft mount illustrated in FIG. 1 shown within the dashed circle labeled 2.
Figure 3:
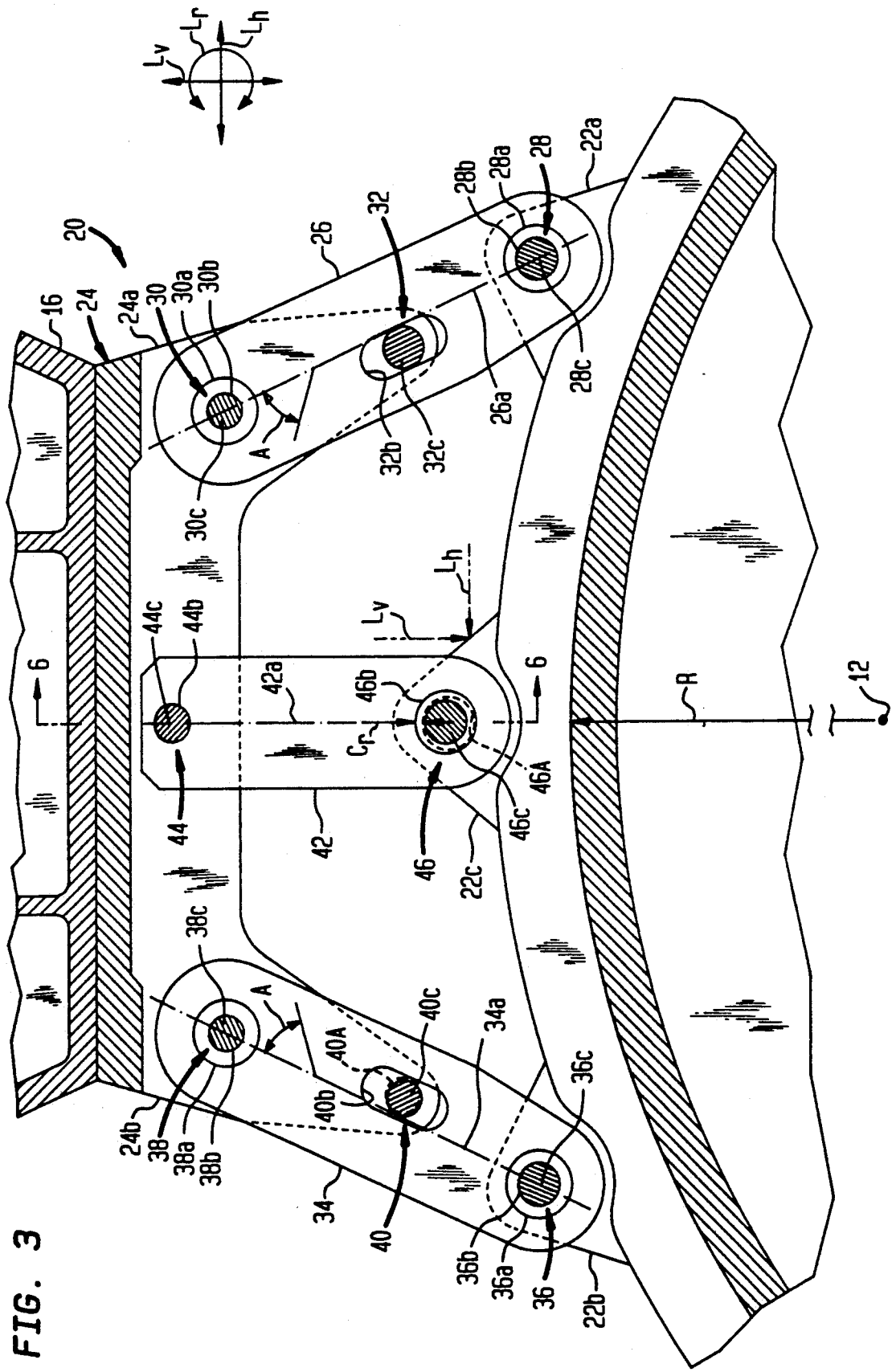
FIG. 3 is a partly sectional, elevation, radial-plane view of the aft mount illustrated in FIG. 2 taken along a vertical plane labeled 3—3 disposed perpendicularly to the engine centerline axis.

The aft mount 20 in accordance with a preferred and exemplary embodiment of the present invention is illustrated in more particularity in FIGS. 2 and 3. The aft mount 20 includes a conventional annular turbine frame 22 having a radius R fixedly joined in the engine 10. A generally rectangular-based platform 24 is conventionally fixedly joined to the pylon 16 by bolts (not shown) for example.

Referring to FIG. 3, an elongate first beam 26 is pivotally joined to the frame 22 at a first joint 28 at one end thereof, and is pivotally joined to the platform at a second joint 30 at an opposite end thereof. The first beam 26 is additionally joined to the platform 24 at a third joint 32 disposed between the first and second joints 28 and 30.

A second beam 34 is spaced circumferentially from the first beam 26 and is pivotally joined to the frame 22 at a fourth joint 36 at one end thereof, and pivotally joined to the platform 24 at a fifth joint 38 at an opposite end thereof. The second beam 34 is additionally joined to the platform 24 at a sixth joint 40 disposed between the fourth and fifth joints 36 and 38. In the exemplary embodiment illustrated in FIG. 3, the first, second, and third joints 28, 30, and 32 are generally linearly aligned along a first longitudinal axis 26a of the first beam 26 extending through the first and second joints 28 and 30. The first beam 26 is inclined from a tangent to the frame 22, in the vertical or axial plane illustrated, at an angle A, of about 40° for example. Similarly, the fourth, fifth, and sixth joints 36, 38, and 40 of the second beam 34 are also generally colinearly aligned along a second longitudinal axis 34a of the second beam 34 extending through the fourth and fifth joints 36 and 38. The second beam 34 is inclined oppositely to the first beam 26 from a tangent to the frame 22 also at the angle A of about 40° for example. In this way, the first and second beams 26 and 34 straddle the top of the frame 22 generally equally about the vertical centerline axis of the frame 22 for supporting the frame 22 vertically as well as horizontally as described in more detail below.

Each of the first, second, fourth, and fifth joints 28, 30, 36, and 38 preferably includes a conventional spherical bearing 28a, 30a, 36a, and 38a conventionally joined to respective ones of the first and second beams 26 and 34, with each spherical bearing including a respective central aperture 28b, 30b, 36b, and 38b. Respective first, second, fourth, and fifth pins or bolts 28c, 30c, 36c, and 38c extend through the respective spherical bearings and are conventionally fixedly joined to respective ones of the platform 24 and the frame 22.

In the exemplary embodiment illustrated in FIGS. 2 and 3, the platform 24 preferably includes circumferentially spaced apart, conventional first and second U-shaped clevises 24a and 24b, respectively, and the frame 22 similarly includes circumferentially spaced apart, conventional first and second U-shaped clevises 22a and 22b, respectively. As shown more particularly in FIG. 2, the second beam 34 is disposed in the second clevises 22b and 24b of the frame 22 and the platform 24, and is joined to the frame second clevis 22b at the fourth joint 36, and to the platform second clevis 24b at both the fifth and sixth joints 38 and 40. The first beam 26 illustrated in FIG. 3 is substantially identical in side view to that of the second beam 34 illustrated in FIG. 2, and is similarly disposed in the first clevises 22a and 24a of the frame 22 and the platform 24, and is joined to the frame first clevis 22a at the first joint 28, and joined to the platform second clevis 24a at both the second and third joints 30 and 32.

Figure 4:
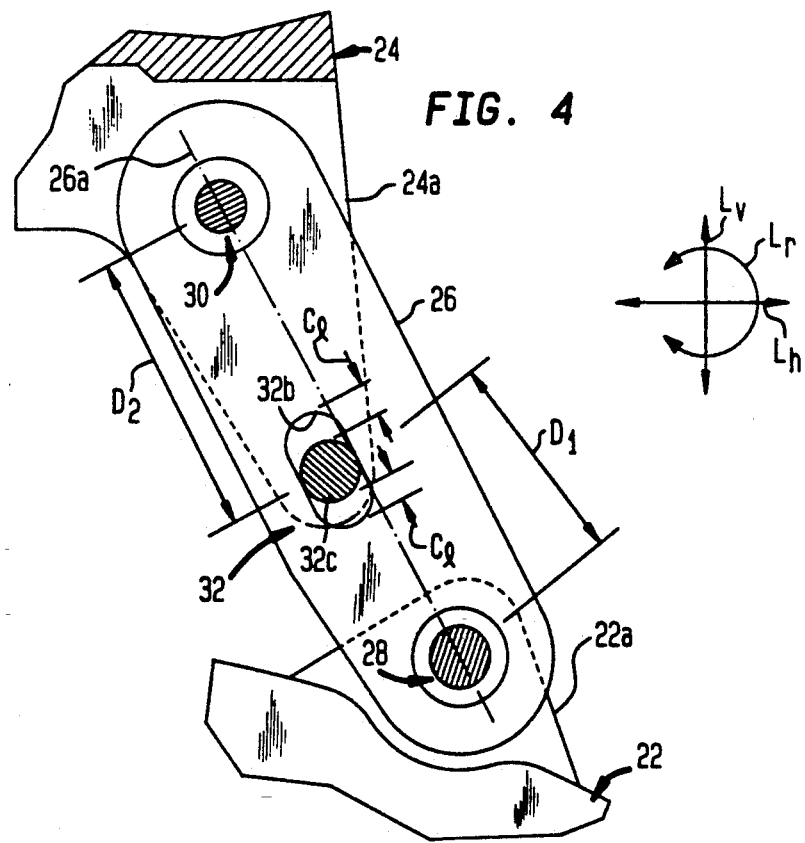
FIG. 4 is an enlarged elevation view of a first beam used in the aft mount illustrated in FIG. 3.

As illustrated in more particularity in FIG. 4, the third joint 32 includes a third aperture 32b in the exemplary form of a longitudinal slot in the first beam 26 preferably aligned parallel to the longitudinal axis 26a. A third bolt or pin 32c is fixedly joined to the platform through the first clevis 24a, which pin 32c extends between the platform 24 and the first beam 26 and through the third aperture 32b. The third aperture 32b is sized for allowing a predetermined longitudinal or generally vertical displacement of the third pin 32c upwardly and downwardly in the third aperture 32b while preventing both transverse or generally horizontal displacement of the third pin 32c in the third aperture 32b and corresponding rotation of the first beam 26 in the radial plane. This may be simply accomplished by providing a relatively tight fit between the third pin 32c and the side surfaces of the third aperture 32b with a clearance therebetween being as small as practical for allowing solely longitudinal sliding movement of the third pin 32c in the third aperture 32b. For example, the side clearances between the third pin 32c and the longitudinal side surfaces of the third aperture 32b may be about 0.05 mm. However, the third aperture 32b is predeterminedly larger in the longitudinal direction relative to the diameter of the third pin 32c for defining initially equal top and bottom longitudinal clearances $C_1$ which allow the third pin 32c to translate upwardly or downwardly in the longitudinal direction in the third aperture 32b for accommodating axial thermal expansion and contraction of the engine 10.

Figure 5:
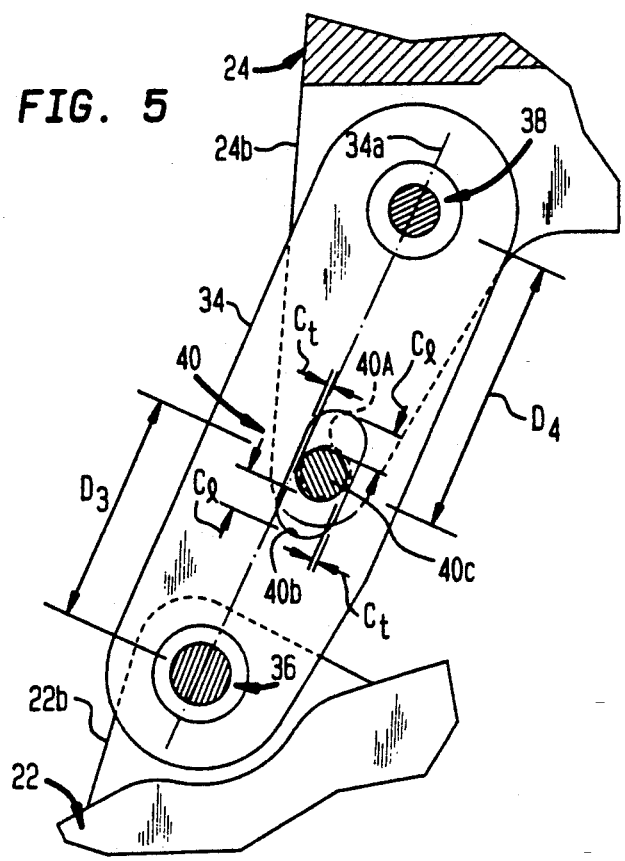
FIG. 5 is an enlarged elevation view of a second beam used in the aft mount illustrated in FIG. 3.

Similarly, and referring to FIG. 5, the sixth joint 40 includes a sixth aperture 40b in the exemplary form of a longitudinal slot in the second beam 34 preferably aligned parallel to the longitudinal axis 34a. A sixth bolt or pin 40c is fixedly joined to the platform through the second clevis 24b, which pin 40c extends between the platform 24 and the second beam 34 and through the sixth aperture 40b. The sixth aperture 40b is also similarly sized for allowing a predetermined longitudinal or generally vertical displacement of the sixth pin 40c upwardly and downwardly in the sixth aperture 40b for accommodating the axial thermal expansion and contraction of the engine 10. The sixth aperture 32b is predeterminedly larger in the longitudinal direction relative to the diameter of the sixth pin 40c for also defining the initially equal top and bottom clearances $C_1$ for allowing longitudinal or generally vertical movement of the sixth pin 40c. For example, the longitudinal clearances $C_1$ above and below the pins 32c and 40c may be about 1.0 mm.

Illustrated in FIG. 2 in phantom line designated 42 is the rotated position of either the first link 26 or the second link 34 due to axial thermal expansion of the engine 10 between the forward mount 18 and the aft mount 20 (see FIG. 1) in an axially extending centerline plane extending along the centerline axis 12 which is disposed perpendicularly to the axial plane illustrated in FIG. 3. Since the engine 10 is heated during operation, it expands axially with the turbine frame clevises 22a and 22b being displaced axially relative to the platform clevises 24a and 24b as shown schematically in FIG. 2. If the third and sixth apertures 32b and 40b (FIGS. 4 and 5) fit tightly adjacent to the respective third and sixth pins 32c and 40c in the vertical direction, free rotation of the first and second beams 26 and 34 in the centerline plane would be restrained, thusly inducing undesirable reaction loads and stresses in the first and second beams 26 and 34. By providing the predetermined longitudinal clearance $C_1$ above and below the respective third and sixth pins 32c and 40c, the third and sixth pins 32c and 40c will be allowed to freely move upwardly and downwardly within the third and sixth apertures 32b and 40b thusly allowing free rotation of the first and second beams 26 and 34 between the respective first and second joints 28 and 30, and fourth and fifth joints 36 and 38 in the centerline plane shown in FIG. 2. The spherical bearings 28a, 30a and 38a allow the first and second beams 26 and 34 to so rotate on the first, second, fourth, and fifth pins 28c, 30c, 36c, and 38c, respectively.

However, the first beam 26 is considered an active or fulltime beam since it is joined to the platform first clevis 24a at both the second and third joints 30 and 32, and joined to the frame first clevis 22a at the first joint 28 and, therefore, is not allowed to rotate in the axial plane relative to the frame 22 and the platform 24 during normal operation. In this way, the first beam 26 is effective for transmitting all in-plane loads in the axial plane from the frame 22 to the platform 24 including vertical loads $L_v$ and horizontal loads $L_h$, and together with the second beam 34, roll loads or moments $L_r$, $L_v$, $L_h$, and $L_r$ are all illustrated schematically in FIGS. 3 and 4 to show opposite positive and negative directions of these loads. The first beam 26 is effective for transmitting such loads from the frame 22 to the platform 24 either through tension or compression of the first beam 26 along its longitudinal axis 26a between the first and second joints 28 and 30, or by elastic bending of the first beam 26 since it is restrained from rotating by the third pin 32c which contacts the side surfaces of the third aperture 32b.

Accordingly, although the first and second beams 26 and 34 are unable to transmit moment loads between the frame 22 and the platform 24 in the centerline plane illustrated in FIG. 2, the first, or fulltime, beam 26 together with the second beam 34 is effective for transmitting all in-plane loads including moment loads in the axial plane illustrated in FIG. 3.

However, the second beam 34 is not such a fulltime beam but is considered a waiting beam since it does not have the ability during normal operation of the mount 20 to transmit moments or any other loads between the frame 22 and the platform 24 other than those directed parallel to its longitudinal axis 34a between the fourth and fifth joints 36 and 38 in either tension or compression in the fashion of a simple link. This is necessary for allowing also unrestrained radial thermal expansion and contraction of the frame 22 without imposing additional reaction forces from the second beam 34. More specifically, and as shown in FIG. 5, the sixth aperture 40b in the second beam 34 is sized predeterminedly larger than the diameter of the sixth pin 40c in the transverse as well as the longitudinal direction in the axial plane for providing a limited clearance completely around the sixth pin 40c. By sizing the sixth aperture 40b larger than the sixth pin 40c, both longitudinal or generally vertical and transverse or generally horizontal displacement of the sixth pin 40c is allowed in the sixth aperture 40b for allowing limited rotation of the second beam 34 in the centerline and axial planes without restraint, or bending between the frame 22 and the platform 24 during normal operation.

As described above, the sixth aperture 40b is preferably sized larger in the longitudinal direction than the diameter of the sixth pin 40c to provide the longitudinal clearances $C_l$ above and below the sixth pin 40c to allow unrestrained axial expansion of the engine 10 with differential axial movement between the clevises of the frame 22 and those of the platform 24. The sixth aperture 40b is also sized predeterminedly larger than the diameter of the fourth pin 40c in the transverse direction to provide transverse or generally horizontal side clearances $C_t$ which are suitably large for allowing the second beam 34 to rotate in the axial plane about the fourth and sixth joints 36 and 40 during normal operation without restraint for accommodating radial expansion and contraction of the turbine frame 22, which radial expansion and contraction will increase and decrease, respectively, the distance between the first joint 28 and the fourth joint 36.

Figure 6:
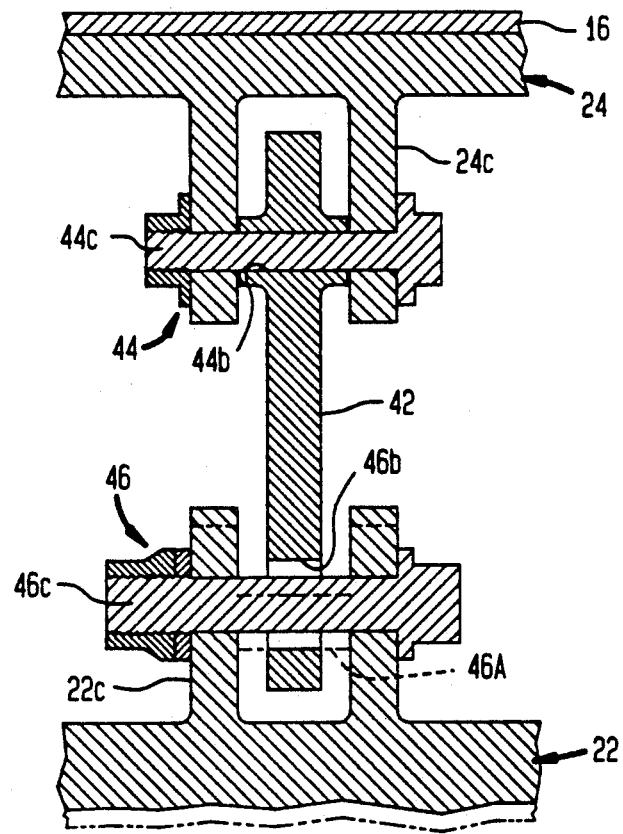
FIG. 6 is a sectional elevation view of a failsafe link used in the aft mount illustrated in FIG. 3 taken along line 6—6.

The aft mount 20 preferably also includes a straight failsafe link 42 preferably disposed or spaced generally parallel between and closely adjacent to the straight first and second beams 26 and 34 as illustrated in FIGS. 3 and 6 which collectively provide a compact arrangement for the aft mount 20. The link 42 is pivotally joined to the platform 24 at a seventh joint 44 at a proximal end thereof, and pivotally joined to the frame 22 at an eighth joint 46 at an opposite distal end thereof. In the preferred embodiment, the frame 22 further includes a U-shaped third clevis 22c in which the eighth joint 46 is made, and the platform 24 includes a U-shaped pocket or clevis 24c in which the seventh joint 44 is made.

The seventh joint 44 includes a seventh aperture 44b in the proximal end of the link 42, and a seventh bolt or pin 44c extending therethrough and fixedly joined to the platform third clevis 24c. The outer diameter of the seventh pin 44c and the diameter of the seventh aperture 44b are conventionally sized, and are substantially equal, for allowing rotation of the link 42 about the seventh pin 44c. The seventh pin 44c may alternatively be disposed in a conventional bushing or spherical bearing if desired.

The eighth joint 46 preferably includes an eighth aperture 46b disposed in the distal end of the link 42, with an eighth bolt or pin 46c extending between the frame 22 and the link 42 and through the eighth aperture 46b, and fixedly joined to the frame third clevis 22c. The eighth aperture 46b is sized suitably larger than the diameter of the eighth pin 46c for allowing both predetermined, limited amounts of vertical and horizontal displacement of the eighth pin 46c in the eighth aperture 46b, and limited rotation of the link 42 in the axial plane during normal operation. In this way, the link 42 carries no load therethrough during normal operation of the mount 20.

More specifically, the eighth pin 46c has an outer diameter, and the eighth aperture 46b is sized predeterminedly larger than the diameter of the eighth pin 46c to provide a predetermined radial clearance $C_r$, about 4.0 mm for example, around the eighth pin 46c. Upon a failure of either the first or second beams 26 and 34 to carry in-plane loads from the frame 22 to the platform 24, the eighth pin 46c contacts the link 42 at the eighth aperture 46b for carrying loads from the frame 22 through the link 42 to the platform 24 solely along a longitudinal axis 42a of the link 42, extending between the seventh and eighth joints 44 and 46, in tension or compression only, without any bending. The link 42 provides an alternate load path for supporting the frame 22 solely upon failure of the first or second beams 26 and 34.

As used herein, failure means either wear, or plastic deformation, or fracture of the first or second beams 26 and 34 or of the several load bearing joints thereof, i.e. the first through fifth joints 28 through 38, respectively, thereof which is sufficient to allow the eighth pin 46c to contact the link 42 at the eighth aperture 46b, and thereby provide an alternate load path from the frame 22 to the platform 24. This may occur by excessive movement beyond a predetermined amount of the frame clevises 22a and 22b relative to the platform 24.

In the event of failure of the second beam 34, the first beam 26 remains effective for transmitting all in-plane loads whether by tension, compression, or bending of the first beam 26, with the additional loads from the second beam 34 being carried by the link 42 in either tension or compression along its longitudinal axis 42a. The aft mount 20 is, therefore, still effective for carrying all required in-plane loads while using a simple link 42 pivotally joined at two joints only, i.e. the seventh and eighth joints 44 and 46. In this way, a larger and heavier, non-rotating failsafe bracket which accommodates also bending loads is not required.

In the event of failure of the first beam 26, the eighth pin 46c will also contact the eighth aperture 46b for providing an alternate load path from the frame 22 to the platform 24. However, since the link 42 is not effective for carrying in-plane off-axis linear loads, the second beam 34 must be effective for carrying such off-axis linear loads in order for the aft mount 20 to carry roll loads in accordance with a preferred embodiment of the present invention.

More specifically, and referring again to FIG. 5, the transverse clearance $C_t$ between the sixth aperture and pin 40b and 40c is provided also so that upon failure of the first beam 26, the second beam 34 contacts the sixth pin 40c at the sixth aperture 40b for preventing rotation of the second beam 34 between the frame 22 and the platform 24 due to such off-axis loads. As described above, the transverse clearance between the third pin 32c and the third aperture 32b of the first beam 26 (see FIG. 4) is substantially zero to allow bending loads to be transmitted through the first beam 26. However,
during normal operation of the mount 20, the transverse clearance $C_t$ between the sixth pin 40c and the sixth aperture 40b is sufficiently large to prevent the transmission of any loads including bending loads through the sixth pin 40c to the second beam 34, and for allowing radial expansion of the frame 22 without bending restraint by the second beam 34. Solely upon failure of the first beam 26 is it then desirable for the second beam 34 to carry bending loads therethrough which will occur once the sixth pin 40c contacts the second link 34 at the sixth aperture 40b. For example, the transverse clearances $C_t$ between the sixth pin 40c and the left and right longitudinal sides of the sixth aperture 40b may be about 1.0 mm.

Failure of the first beam 26 will allow both the sixth pin 40c and the eighth pin 46c to contact the second beam 34 and the failsafe link 42 at the sixth aperture 40b and the eighth aperture 46b, respectively. Rotation of the second beam 34 about the fifth joint 38 is, therefore, prevented once the sixth pin 40c is in contact with the middle of the second beam 34 at the sixth aperture 40b. For example, and referring to FIGS. 3 and 6, one type of failure of the first beam 26 will allow a vertical load $L_v$, such as a portion of the weight of engine 10 (shown in phantom) to act on the frame third clevis 22c which will cause the eighth pin 46c to drop and contact the bottom of the eighth aperture 46b as shown in plantom line designated 46A. Upon application of a left horizontal load $L_h$ on the frame third clevis 22c, also designated in phantom line, the fourth pin 46c will move horizontally to the left in FIG. 3 with corresponding rotation of the link 42 to slightly rotate the second beam 34 clockwise about the fifth joint 38 until the sixth pin 40c contacts the right side surface of the sixth aperture 40b, designated in phantom line as 40A. Further movement or clockwise rotation, of the second beam 34 about the fifth joint 38 is therefore prevented resulting in bending loads being transmitted through the second beam 34. In this way, the second beam 34, upon failure of the first beam 26, provides 3-joint restraint and is effective for transmitting in-plane loads including vertical and horizontal loads, and, together with the failsale link 42, roll moments are also transmitted in a manner similar to that of the 3-joint first beam 26 prior to failure. If the application of the horizontal load $L_h$ is in an opposite direction, to the right as shown in FIG. 3, the sixth pin 40c will contact instead the left side of the sixth aperture 40b and again be effective for transmitting in-plane loads including vertical and horizontal.

Prior to failure of the first beam 26, the second beam 34 acts as a simple link supported at solely the two joints 36 and 38 for carrying loads solely along its longitudinal axis 34a in either tension or compression. However, upon failure of the first beam 26, the second beam 34 acts as a beam fixedly secured at the three joints 36, 38 and 40 for transmitting in-plane loads including vertical and horizontal, and is therefore subject to bending in a fashion similar to that of the first beam 26 prior to failure thereof. Accordingly, the second beam 34 is a waiting beam since it normally acts as a 2-joint link and awaits failure of the first beam 26 before acting as a 3-joint beam for transmitting bending loads and all other in-plane loads. In normal operation, the second beam 34 continues to function as a simple link and, therefore, retains simplicity of structure and allows for a compact arrangement of the first and second beams 26 and 34 and the failsafe link 42 within a limited envelope.

Referring again to FIGS. 4 and 5, the first beam 26 is preferably straight and the first, second, and third joints 28, 30, and 32 are generally colinearly aligned. The first and third joints 28 and 32 are spaced longitudinally apart on centers at a first distance $D_1$, and the second and third joints 30 and 32 are longitudinally spaced apart on centers at a second distance $D_2$, with the second distance $D_2$ being preferably greater than the first distance $D_1$.

Similarly, the second beam 34 is preferably straight and the fourth, fifth, and sixth joints 36, 38, and 40 are generally colinearly aligned. The fourth and sixth joints 36 and 40 are longitudinally spaced apart on centers at a third distance $D_3$, and the fifth and sixth joints 38 and 40 are longitudinally spaced apart on centers at a fourth distance $D_4$, with the fourth distance $D_4$ being preferably greater than the third distance $D_3$. The first and third distances $D_1$ and $D_3$ represent moment arms about which loads are applied from the frame 22 to the platform 24 through the respective first and second beams 26 and 34. The second and fourth distances $D_2$ and $D_4$ are the reaction moment arms across which the applied loads are reacted through the platform first and second clevises 24a and 24b. By sizing the first and second distances $D_1$ and $D_3$ less than the respective second and third distances $D_2$ and $D_4$, the shear loads acting through the second and firth pins 30c and 38c due to the respective reaction couples or moments are reduced compared to the applied loads. If the distances $D_1$ and $D_3$ were greater than the distances $D_2$ and $D_4$, respectively, amplification of the applied loads would occur resulting in larger shear loads at the pins. By reducing the reaction loads in the second and fifth pins 30c and 38c, the shear stresses in the second, third, fifth and sixth pins 30c, 32c, 38c, 40c are reduced which improves the life of the mount 20 and allows for the components thereof to be made correspondingly smaller and more compact if desired. The straight first and second beams 26 and 34 may be placed closer to the failsafe link 42 for also providing a more compact mount.

Figure 7:
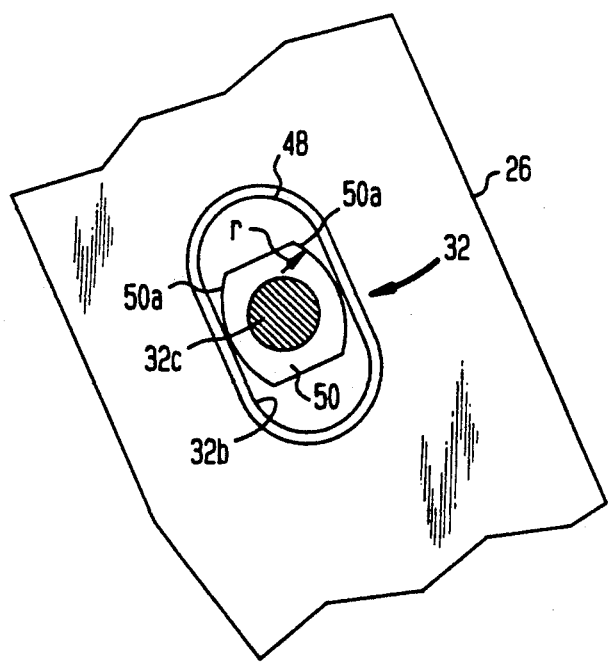
FIG. 7 is an enlarged view of a center portion of the first beam illustrated in FIG. 4 showing a third joint in accordance with an alternate embodiment of the present invention.

The third and sixth pins 32c and 40c shown in the embodiments illustrated in FIGS. 4 and 5 are preferably cylindrical, but in alternate embodiments could have square or rectangular, or relatively large arcuate surfaces for spreading loads between the pins and the respective third and sixth apertures 32b and 40b for reducing contact stress therebetween. As shown in FIG. 7 with respect to the third pin 32c, but identically applicable to the sixth pin 40c, the pins 32c, 40c may be cylindrical, with the third and sixth joints 32 and 40 further including a suitable, relatively hard wear bushing 48 disposed in the first and second beams 26 and 34, respectively. The bushings 48 include a central aperture which defines the respective third and sixth apertures 32b and 40b. The bushings 48 may be made from Inconel for example.

Each of the third and sixth joints 32 and 40 may also include a tubular block 50 as shown for example in FIG. 7, pivotally surrounding respective ones of the third and sixth pins 32c and 40c in the respective third and sixth apertures 32b and 40b. The block 50 has arcuate longitudinal side surfaces 50a having a radius r for contacting the first and second beams 26 and 34 at the third and sixth apertures 32b and 40b for reducing stress induced therein due to the loads carried through the third and sixth pins 32c and 40c to the platform 24. The radius r of the side surfaces 50a may be suitably larger than the radius of the pins 32c, 40c and, in the limit may reach infinity for providing a rectangular block 50 within the respective apertures 32b, 40b. The block 50 may also be formed from inconel or other suitable material for providing reduced wear for obtaining an effective life of the aft mount 20. However, the bushing 40 and the block 50 may be periodically replaced as they wear for improving the overall life of the entire aft mount 20.

Figure 8:
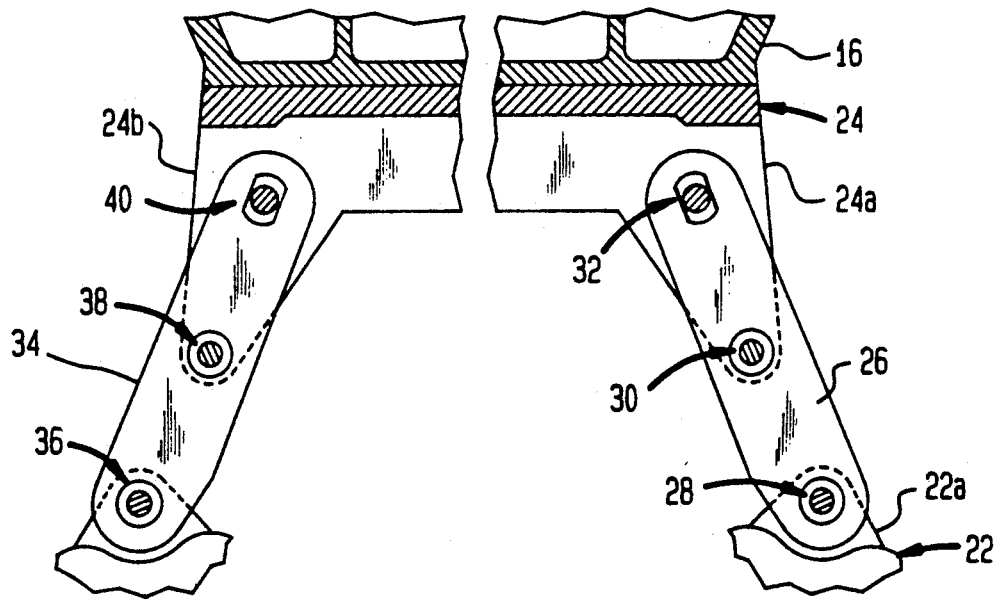
FIG. 8 is a partly sectional elevation view similar to FIG. 3 illustrating an aft mount in accordance with another embodiment of the present invention.

Illustrated in FIG. 8 is an alternate embodiment of the present invention wherein the second joint 30 is disposed longitudinally between the first and third joints 28 and 32 in the first beam 24, and similarly, the fifth joint 38 is disposed longitudinally between the fourth and sixth joints 36 and 40 in the second beam 34. Although the two pivotal joints of each beam, i.e. 28 and 30, and 36 and 38, are disposed adjacent to each other, with the clearance-joints 32 and 40 now being disposed respectively above those two pivotal joints, effective operation of the aft mounts 20 as above described will also occur.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, the third and sixth apertures 32b and 40b could alternatively be disposed in the platform clevises 24a and 24b, with the third and sixth pins 32c and 40c being fixedly joined to the first and second beams 26 and 34 and extending therein. The first and second beams 26 and 34 could have clevises at their ends joined to single radial flanges extending from the frame 22 and platform 24. Clevises could be eliminated altogether by using simple lap joints instead. And, all friction surfaces could be hardened for reducing wear, or provided with lubricant coatings.

Furthermore, the third and sixth apertures 32b and 40b could extend vertically or at other inclinations provided adequate clearance with the third and sixth pins 32c and 40c is maintained for accommodating thermal growth of the engine 10 without binding of the aft mount 20. The preferred orientations thereof described above are more effective for reducing shear loads and stresses in the outer and middle pins 30c, 32c, 38c, and 40c.

Accordingly, what is desired to be secured by Letters Patent of the United States is the invention as defined and differentiated in the following claims:

We claim:

1. A mount for supporting a gas turbine engine to an aircraft pylon comprising:

a frame fixedly joined in said gas turbine engine;

a platform fixedly joined to said pylon;

a first beam pivotally joined to said frame at a first joint and pivotally joined to said platform at a second joint, and joined additionally to said platform at a third joint including a third-joint pin extending between said platform and said first beam and through a third-joint aperture in one of said first beam and said platform sized for allowing longitudinal displacement of said third-joint pin in said third-joint aperture while preventing both transverse displacement of said third-joint pin in said third-joint aperture and corresponding rotation of said first beam; and a second beam spaced from said first beam, and pivotally joined to said frame at a fourth joint and pivotally joined to said platform at a fifth joint, and joined additionally to said platform at a sixth joint including a sixth-joint pin extending between said platform and said second beam and through a sixth-joint aperture in one of said second beam and said platform sized for allowing both longitudinal and transverse displacement of said sixth-joint pin in said sixth-joint aperture and limited rotation of said second beam.

2. An aircraft engine mount according to claim 1 further including a link pivotally joined to said platform at a seventh joint, and joined to said frame at an eighth joint including an eighth-joint pin extending between said frame and said link and through an eighth-joint aperture in one of said link and said frame sized for allowing limited vertical and horizontal displacement of said eighth-joint pin in said eighth-joint aperture.

3. An aircraft engine mount according to claim 2 wherein:
    said third-joint pin is fixedly joined to said platform and extends through said third-joint aperture being disposed in said first beam;
    said sixth-joint pin is fixedly joined to said platform and extends through said sixth-joint aperture being disposed in said second beam; and
    said eighth-joint pin is fixedly joined to said frame and extends through said eighth-joint aperture being disposed in said link.

4. An aircraft engine mount according to claim 3 wherein:
    said eighth-joint pin has a diameter, and said eighth-joint aperture is sized larger than said eighth-joint pin diameter so that upon a failure of said first beam to carry a load from said frame to said platform, said eighth-joint pin contacts said link at said eighth-joint aperture for carrying said load from said frame to said platform through said link; and
    said sixth-joint aperture is sized larger than said sixth-joint pin to provide a limited transverse clearance therebetween so that upon said first beam failure said second beam contacts said sixth-joint pin at said sixth-joint aperture for preventing rotation of said second beam between said platform and said frame due to said load.

5. An aircraft engine mount according to claim 4 wherein:
    said link is disposed between said first and second beams;
    said third joint is disposed between said first and second joints in said first beam; and
    said sixth joint is disposed between said fourth and fifth joints in said second beam.

6. An aircraft engine mount according to claim 5 wherein:
    said first, second, and third joints are generally colinearly aligned;
    said first and third joints are spaced apart a first distance, and said second and third joints are spaced apart a second distance, and said second distance is greater than said first distance;
    said fourth, fifth, and sixth joints are generally colinearly aligned; and
    said fourth and sixth joints are spaced apart a third distance, and said fifth and sixth joints are spaced apart a fourth distance, and said fourth distance is greater than said third distance.

7. An aircraft engine mount according to claim 4 wherein:
    said second joint is disposed between said first and third joints in said first beam; and
    said fifth joint is disposed between said fourth and sixth joints in said second beam.

8. An aircraft engine mount according to claim 4 wherein each of said first, and second, fourth, and fifth joints includes:
    a spherical bearing joined to respective ones of said first and second beams, and including a central aperture; and
    a pin extending through said spherical bearing and fixedly joined to respective ones of said platform and said frame.

9. An aircraft engine mount according to claim 4 wherein each of said third and sixth joints includes a bushing disposed in said first and second beams, respectively, having a central aperture defining said third-joint and sixth-joint apertures, respectively.

10. An aircraft engine mount according to claim 4 wherein each of said third and sixth joints includes a block pivotally surrounding said third-joint and sixth-joint pins in said third-joint and sixth-joint apertures, respectively, said block having arcuate side surfaces for contacting said first and second beams at said third-joint and sixth-joint apertures, respectively, for reducing stress induced therein due to said load carried through said third-joint and sixth-joint pins to said platform.

11. An aircraft engine mount according to claim 4 wherein:
    said platform includes spaced first and second clevises;
    said frame includes spaced first and second clevises;
    said first beam is joined to said frame first clevis at said first joint, and to said platform first clevis at said second and third joints; and
    said second beam is joined to said frame second clevis at said fourth joint, and to said platform second clevis at said first and sixth joints.

12. An aircraft engine mount according to claim 4 wherein:
    said first beam includes a first longitudinal axis extending between said first and second joints, and said third-joint pin longitudinal displacement is parallel to said first longitudinal axis; and
    said second beam includes a second longitudinal axis extending between said fourth and fifth joints, and said sixth-joint pin longitudinal displacement is parallel to said second longitudinal axis.

* * * * *